March 16, 1926.
O. A. HANFORD
1,576,743
GLASS FORMING APPARATUS AND METHOD OF FORMING GLASS
Filed April 14, 1921   2 Sheets-Sheet 1
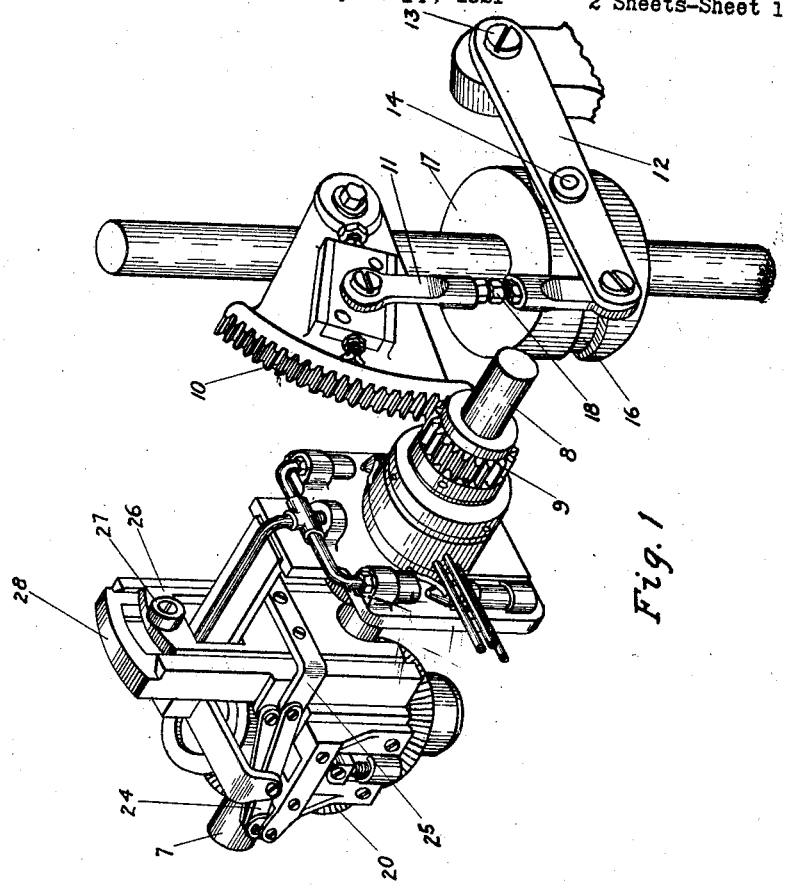
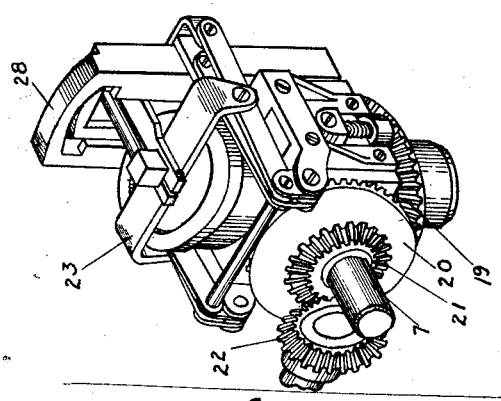
INVENTOR.
BY
ATTORNEY.

March 16, 1926.
O. A. HANFORD
1,576,743
GLASS FORMING APPARATUS AND METHOD OF FORMING GLASS
Filed April 14, 1921     2 Sheets-Sheet 2
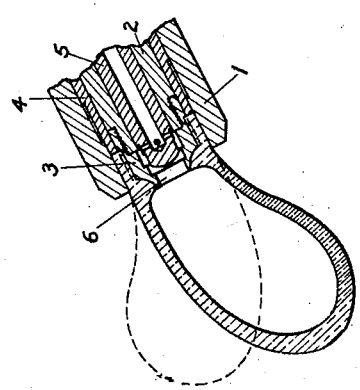
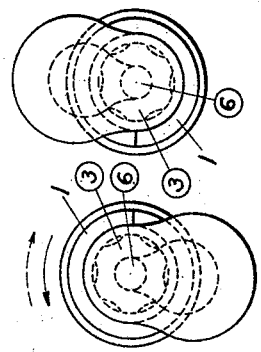
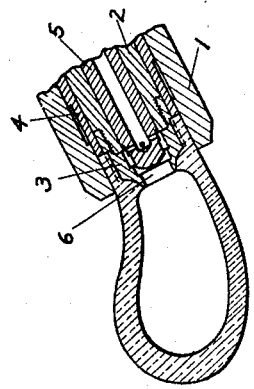
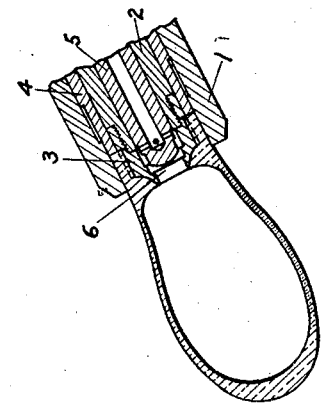
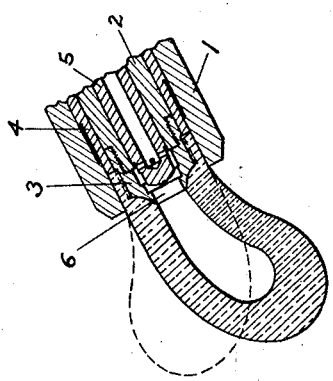
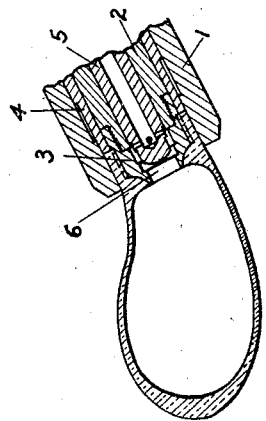
INVENTOR.
BY
ATTORNEY.

Patented Mar. 16, 1926.

1,576,743

UNITED STATES PATENT OFFICE.

ORIN A. HANFORD, OF COLUMBUS, OHIO, ASSIGNOR TO THE FEDERAL GLASS COMPANY, OF COLUMBUS, OHIO, A CORPORATION OF OHIO.

GLASS-FORMING APPARATUS AND METHOD OF FORMING GLASS.

Application filed April 14, 1921. Serial No. 461,267.

*To all whom it may concern:*

Be it known that I, ORIN A. HANFORD, a citizen of the United States of America, residing at Columbus, in the county of Franklin and State of Ohio, have invented certain new and useful Improvements in Glass-Forming Apparatus and Methods of Forming Glass, of which the following is a specification.

My invention relates to glass forming apparatus and method of forming glass and pertains more particularly to the production of blown glass-ware. It has to do especially with that phase of the formation of blown glass-ware which is generally known as elongation of the blank.

In the past this operation has been performed both by hand and by machinery. In the hand method, the operator customarily marvers the blank, introduces a puff of air and then oscillates the pipe with the blank thereon at an angle from the vertical. He never introduces air during oscillation. In the machine method, the blank is affixed to a pipe or blowing head and elongation is attained by oscillation or rotation while the blank is depending vertically, air being introduced during oscillation or rotation.

I have discovered that far better results are attained by oscillation of the blank at an angle from the vertical while air is being introduced. The oscillation at an angle from the vertical is particularly valuable because it results in stretching of the upper side of the blank and compression of the lower side of the blank simultaneously. Then, immediately afterwards, this operation is reversed, the side of the blank which was stretched becoming the lower side and being compressed and the side which was compressed becoming the upper side and being stretched.

This alternate stretching and compression of the respective sides of the blank results in a uniform elongation which is not attainable with vertical elongation where the weight of the lower end of the blank has a tendency to weaken the walls thereof adjacent the retaining head. Furthermore, the oscillation at an angle from the vertical is necessarily more uniform when performed by machinery than when performed by hand and when this is supplemented by the simultaneous introduction of air, the saving of time and the increased efficiency will be obvious.

In performing my method I preferably use the apparatus shown in the appended drawings wherein similar characters of reference designate corresponding parts and wherein—

Figure 1 is a perspective view of the apparatus preferably used by me for receiving and manipulating the glass blank throughout the various operations culminating in final formation of the article.

Figure 2 is a perspective view of the glass carrying unit per se, partially broken away to illustrate the operating mechanism thereof.

Figure 3 is a detail view of the blank holding head in the initial stage of formation of the blank, wherein a small puff of air has been introduced and the blank is sagging so as to stretch the upper side and compress the lower side. The dotted lines show the position from which the blank has dropped.

Figure 4 shows the blank in the position it assumes immediately after, wherein additional air has been introduced and the blank holding head partially rotated.

Figure 5 is a view illustrating the blank immediately after the next rotation, the dotted and full line presentations indicating the position from which the blank drops to effect stretching of the opposite side from that stretched in Fig. 3 and also to effect compression of the under side of the blank.

Figure 6 is a view illustrating the immediately subsequent step to that shown in Figure 5.

Figure 7 is a similar view of the blank holding head with the blank at the termination of the elongation process.

Figure 8 is a detail view in end elevation of the blank as shown in Figures 3 to 6, inclusive, the alternate directions of movement of the blank being illustrated by the dotted and full line arrows.

Figure 9 is a similar view to Figure 8 illustrating the blank in the position it assumes immediately after oscillation from the position shown in Figure 8.

In the drawings, the blank holding head may be designated 1 and is provided with an outer sleeve and an inner cylindrical post 2. This cylindrical post 2 is provided with a reduced corrugated head 3 and the blank is so pressed onto this head that its inner end is firmly held in between the corrugated head 3 and the sleeve of the blank holding head 1. The affixing of this blank to the holding head may be accomplished in any desired manner.

The blank holding head is further provided with an ejecting sleeve 4 which is reciprocable to eject the blank at any stage of the operation but is primarily utilized in ejecting the blown article at the finish of the forming operations. The holding head is further provided with a reciprocable plug 5 that is movable into the opening 6 of the head 3 so as to exclude the glass from entering this opening while the blank is being affixed to the head. After this blank is so affixed, this plug 5 is withdrawn to the position shown in Figures 3, 4, 5, 6 and 7 so that air may be introduced into the blank in a manner that will be readily understood.

The essential feature of my method arises from the fact that the elongation of the blank is effected by oscillation of this blank mechanically while the blank holding head is held at an angle. During this oscillation, intermittent puffs of air are introduced into the blank and are held therein while expansion takes place. The result of this is illustrated in Figures 3 to 6 inclusive, wherein it will appear that the blank first sags to stretch the upper side and compress the lower side of the blank and then is oscillated to a new position wherein the side which has just been compressed becomes the upper side and is stretched while the side which has just been stretched becomes the lower side and is compressed. An attempt has been made to illustrate this by the shading of the glass to indicate that the glass that has just been compressed is of greater density than the glass that has just been stretched.

The apparatus for operating the glass holding unit is shown best in Figures 1 and 2 wherein it will appear that the glass holding head is mounted upon trunnions 7 and 8. Carried adjacent one end of the trunnion 8 is a gear 9 which is designed to mesh with a sector 10. This sector 10 is movable to various positions by means of a link 11 connected at one end to the sector and at its opposite end to a lever 12. The lever 12 is fulcrumed at 13 and carries a roller or pin 14 designed to run in a cam groove 16 of the cam 17. This sector is driven by the cam 17 to so drive the gear 9 that the glass retaining head will be moved in any rotary direction. Normally, it is first so moved that the glass retaining head passes to the vertical position directly opposite the positions shown in Figures 1 and 2, that is, it is so moved that its glass receiving cavities are uppermost and are in a position to receive a charge of glass to be dropped therein. This charge of glass is desirably pressed into the cavities of the glass receiving head and this may be facilitated by a superimposed collar mold together with a downwardly operating plunger for cooperation therewith. The exact centering of the glass receiving head to any position of adjustment may be ensured by means of the turnbuckle structure 18.

The rotary movement of the glass receiving head is effected through the medium of a miter gear 19 carried by the head and it is driven by a miter gear 20 upon the trunnion 7. This miter gear 20 is provided upon its outer surface with a miter gear 21 that in turn meshes with the miter driving gear 22 as shown in Figure 2. This miter driving gear 22 is so connected that it may be operated to effect a partial rotation of the glass retaining head in one direction and then a reversal followed by a constant repetition of these oscillatory movements.

For the purpose of this case, it is hardly necessary to enter into a detailed description of the remaining portions of the mechanisms illustrated in Figures 1 and 2. It suffices to say that the plug which controls the opening 6 of the glass retaining head is operated through the medium of the yoke 23, the link 24, the yoke 25 and the slide member 26 to which the yoke 25 is connected. This is accomplished by means of cam surfaces which cooperate with the roller 27. Also, it need only be briefly pointed out that the ejector sleeve 4 of the glass retaining head is finally actuated by the shoe 28 that is in turn designed for contact at the proper time with cam-like surfaces.

It will be seen that I have not only provided a novel method of elongating glass blanks but that I have provided a novel apparatus for accomplishing the same, the combined result being that the steps of elongation can be produced with complete freedom from the constant variations that occur in the hand method. Yet, I have preserved all of the advantages of the hand method and the elongation of the blank is rendered uniform by the alternate compression and expansion of practically every wall of the blank, this alternate compression and expansion occurring with frequency and regularity throughout the oscillation and throughout the various parts of each oscillation. It will further be obvious that I have provided a method and means wherein this oscillation may be effected while air is being introduced into the blank, it being unnecessary to interrupt oscillation during such introduction.

Having thus described my invention, what I claim is:

1. In the manufacture of blown glass-ware by machine, the method of elongating a blank which comprises oscillating it about an axis positioned at an angle from the vertical.

2. In the manufacture of blown glassware, the method of elongating a blank which comprises oscillating the blank at an angle from the vertical and simultaneously introducing air into said blank.

3. In the manufacture of blown glassware, the method of elongating a blank which comprises oscillating the blank at an angle from the vertical and intermittently introducing puffs of air during such oscillation.

4. In apparatus for producing blown glass-ware, means for retaining a glass blank and means for oscillating said retaining means at an angle from the vertical to elongate the blank.

5. In apparatus for producing blown glass-ware, means for retaining a glass blank and elongating the blank by means for oscillating it at an angle from the vertical while introducing air into it.

6. In apparatus for producing blown glass-ware, means for retaining a glass blank and elongating the blank by means for oscillating it at an angle from the vertical while intermittently introducing puffs of air into it.

7. In apparatus for producing blown glass-ware, means for retaining a glass blank, means for oscillating said retaining means about an inclined stationary axis with the blank thereon to elongate the blank, and means for introducing air into said blank during such oscillation.

8. In the manufacture of blown glassware, the method of elongating a blank which comprises oscillating it about its own axis while downwardly inclined and at the same time introducing air into it and then enclosing the blank in a blow mold and blowing.

9. The method of producing blown ware which comprises holding the blank downwardly inclined and stretching alternate sides of the blank to elongate.

10. The method of producing blown ware which comprises holding the blank downwardly inclined and stretching alternate sides of the blank to elongate said introducing puff air during such elongation.

11. The method of producing blown ware which comprises stretching alternate sides of the blank by oscillation of the blank about an axis positioned at an angle from the vertical.

12. The method of producing blown ware which comprises stretching alternate sides of the blank by oscillation of the blank at an angle from the vertical while introducing puff air.

13. The method of producing blown glassware which comprises first forming a blank and then simultaneously elongating and expanding the blank while downwardly inclined in one position prior to enclosing in a blow mold.

14. The method of producing blown ware which comprises positively positioning the blank at an angle below the horizontal and simultaneously elongating and introducing air into the blank in this position.

15. Glass blowing apparatus comprising means for oscillating a blank at an angle from the vertical and about its own axis, the oscillation of said blank being such that the sides will be alternately stretched and compressed.

In testimony whereof I hereby affix my signature.

ORIN A. HANFORD.

Certificate of Correction.

It is hereby certified that in Letters Patent No. 1,576,743, granted March 16, 1926, upon the application of Orin A. Hanford, of Columbus, Ohio, for an improvement in "Glass-Forming Apparatus and Methods of Forming Glass," errors appear in the printed specification requiring correction as follows: Page 3, line 21, claim 5, strike out the words "means for" and insert the same before the word "elongating" in the same line; same page, lines 26 and 27, claim 6, strike out the words "means for" and insert the same before the word "elongating" in line 26: and that the said Letters Patent should be read with these corrections therein that the same may conform to the record of the case in the Patent Office.

Signed and sealed this 11th day of May, A. D. 1926.

[SEAL.]

M. J. MOORE,
*Acting Commissioner of Patents.*